UNITED STATES PATENT OFFICE.

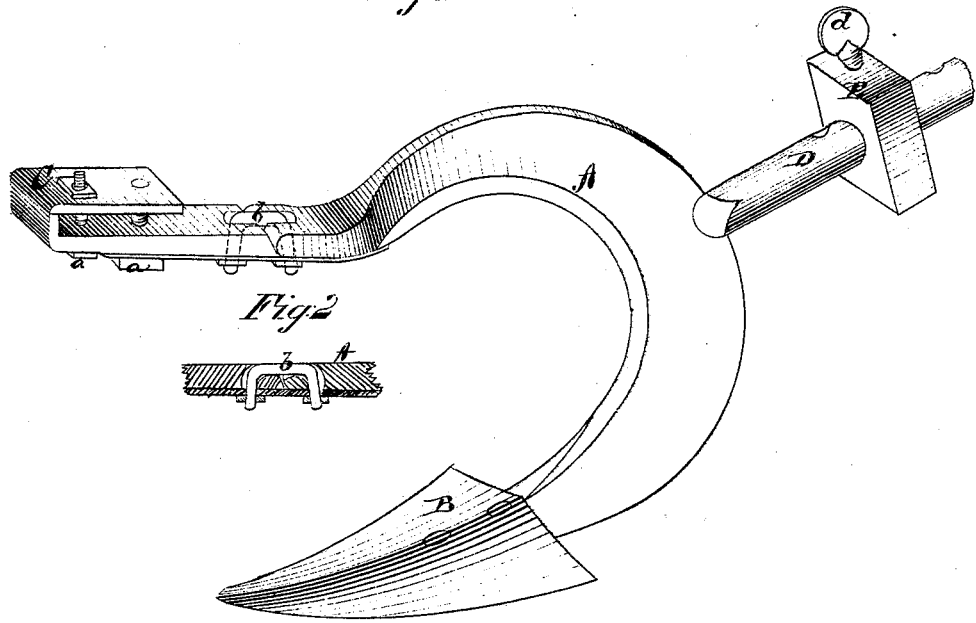

ROSS JOHNSON, OF LAWRENCE, KANSAS.

IMPROVEMENT IN ATTACHMENTS TO PLOWS FOR SUBSOILING.

Specification forming part of Letters Patent No. 111,852, dated February 14, 1871.

*To all whom it may concern:*

Be it known that I, ROSS JOHNSON, of Lawrence, in the county of Douglas, and in the State of Kansas, have invented certain new and useful Improvements in Subsoil Attachment for Plows; and I do hereby declare that the following is a full, clear, and exact description thereof, reference being had to the accompanying drawings, and to the letters of reference marked thereon, making a part of this specification.

My present invention is intended as an improvement upon the "subsoiler" for which Letters Patent were granted to me May 10, 1870; and it consists, first, in making the shank of the subsoiler in two parts hinged together; second, in attaching to said shank a lever with an adjustable or movable weight; and, third, in making the hook which fastens the subsoiler to the plow in two pieces, all of which will be hereinafter more fully set forth.

In order to enable others skilled in the art to which my invention appertains to make and use the same, I will now proceed to describe its construction and operation, referring to the annexed drawings, in which—

Figure 1 is a perspective view of my subsoiler and improvements thereon, and Fig. 2 is a section through the hinge.

A represents the subsoil bar or shank with cutting-edge, and barb or blade B, constructed, substantially, in the same manner as described in my former patent. The front end of the shank B is turned, as shown, to form the hook C; but in this case the upper part of said hook is made of a separate piece, and held in place by two bolts, $a$ $a$, as shown, the bar under the plow to which the subsoiler is attached passing between said bolts or set-screws. The vertical part of the hook C may be entirely cut off, if so desired, as it is of no use, the subsoil being held by the bolts $a$ $a$. A suitable distance in rear of the hook C the shank A is cut in two and hinged together by any suitable and convenient hinge or other means. The hinge $b$ relieves the strain upon the neck of the subsoiler, and also does away with all twisting strain upon the bar of the plow, to which the subsoiler is attached, the only pressure upon said bar with this improvement being against its forward edge, directly in the line of draft of the plow itself, where it properly belongs. Said hinge prevents the breaking of the barb or shovel in case it comes in contact with a rock or other obstacle, as it enables the curve of the hook to be drawn up automatically, thus allowing the barb to pass over the obstruction beneath.

On the back of the curved portion of the shank A is a rod or lever, D, provided with a movable weight, E, secured upon it by a thumb-screw, $d$. This arrangement is mainly for the purpose of holding the barb down to its work or place beneath the pan of the furrow. It is obvious that the depressing effect of this arrangement may be regulated at will by increasing or diminishing either the weight itself or the length of the lever; or, if desired, the lever may be extended backward and upward far enough to come within convenient reach of the hand of the plowman, who in this case can regulate the depth of the subsoiling by either raising or lowering the end of the lever, and can with equal facility relieve the barb in case it encounters any hidden obstruction.

When the short lever and heavy weight are employed, the hinge will enable the plowman to raise the barb with the foot, and by properly locating and constructing the hinge for that purpose the entire barb and curve may be folded or turned back upon the neck of the subsoiler, and thus set out of the way when not in use.

It may be found of advantage, perhaps, to extend the other end of the lever forward and provide a small traveling-wheel at its extremity, which wheel will pass over the pan of the furrow in advance of the barb, and thus, in the event of the latter meeting an obstruction, may serve as a fulcrum in raising the barb out of the earth until the impediment has been passed over.

Having thus fully described my invention, what I claim as new, and desire to secure by Letters Patent, is—

The combination of the shank A, made in two pieces hinged together, and provided with the plate C, secured by the bolts $a$ $a$, all substantially as set forth.

In testimony that I claim the foregoing I have hereunto set my hand this 28th day of November, 1870.

ROSS JOHNSON.

Witnesses:
 E. D. HAMMOND,
 GEORGE A. MCMILLAN.